(No Model.)

N. W. PAYNE.
FAUCET FOR BEER BARRELS.

No. 289,703. Patented Dec. 4, 1883.

Witnesses:

Inventor:
Newton W. Payne
by his attorney

UNITED STATES PATENT OFFICE.

NEWTON W. PAYNE, OF BOSTON, MASSACHUSETTS, ASSIGNOR TO HIMSELF, AND BENJAMIN J. DOWNS AND JOHN W. COOK, BOTH OF WEST SOMERVILLE, MASS.

FAUCET FOR BEER-BARRELS.

SPECIFICATION forming part of Letters Patent No. 289,703, dated December 4, 1883.

Application filed July 30, 1883. (No model.)

*To all whom it may concern:*

Be it known that I, NEWTON W. PAYNE, a citizen of the United States, residing at Boston, in the county of Suffolk and State of Massachusetts, have invented certain new and useful Improvements in Faucets for Beer-Barrels; and I do hereby declare that the same are fully described in the following specification and illustrated in the accompanying drawings.

The object of this invention is to facilitate the tapping of beer-barrels and the like without escape of the effervescent liquid; and to this end I provide means for attaching the faucet to the keg or barrel before the plug or tap is driven in, and also means for subsequently dislodging the plug.

My invention consists in a faucet and sleeve of peculiar construction, as hereinafter pointed out and claimed.

Figure 1:
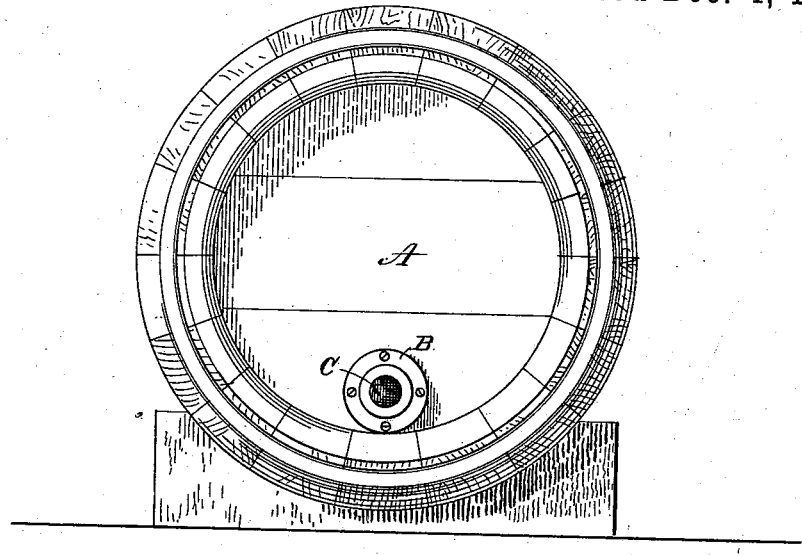
Figure 2:
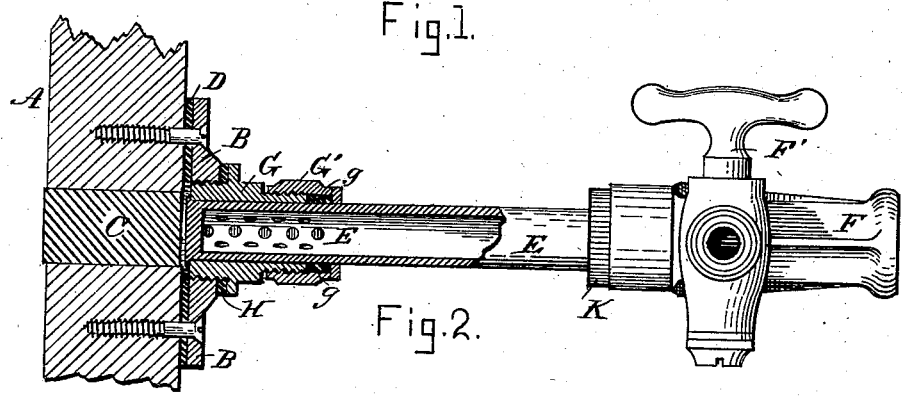
Figure 3:
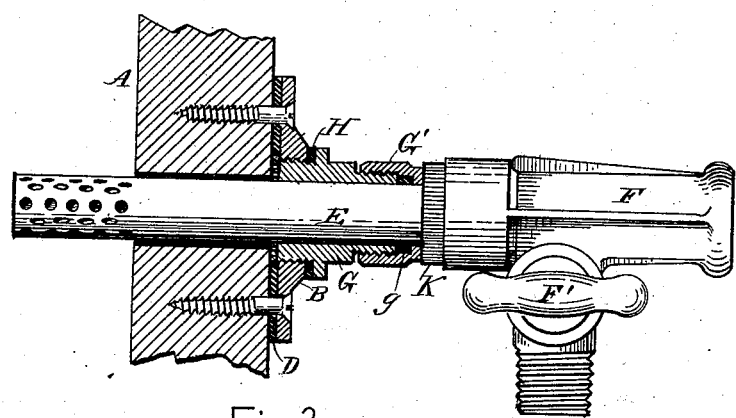

In the drawings, Figure 1 represents the head of a beer-barrel provided with a threaded collar. Fig. 2 shows the same in section, the plug in place, and the faucet screwed on, while Fig. 3 shows the usual working position of the parts after the plug has been driven in.

A is the head of the barrel, and B the metallic collar, secured thereto by screws or otherwise, so as to surround the tap-hole and its plug C. An annular packing, D, is placed beneath the collar, that no leakage may occur at that point. The collar and its packing-ring are permanent fixtures on the head of the barrel, the faucet being attached when desired and removed when the liquid is all drawn off. The means of attachment herein shown are simply the threaded collar and a corresponding thread on the faucet. The faucet is intended for use as a means of removing the plug from the tap-hole after proper connection between the faucet and the barrel has been made. After a threaded part of the faucet is made fast to the threaded collar on the barrel, a cylindrical part is forced inwardly through said collar, driving the plug into the barrel, and giving the liquid its ordinary vent through the faucet. The faucet has a solid head or hub, F, to receive the driving-blow, and a cylindrical shank or stem, E, in line therewith, so that it may be driven through the threaded part G G', shaped internally to fit it, and this shank is tubular, and perforated at its inner end, to serve as a duct, through which the liquid is drawn off by the cock F'. The body or shank of the faucet thus has a sliding movement through the part which is screwed to the collar on the barrel. This part G G' may be a simple sleeve fitted on the shank E, as tightly as is consistent with such sliding movement, and threaded at its inner end for attachment to the collar B; but I much prefer to form it, as shown, as a stuffing-box, with a packing, g, between the two parts, which, being threaded, may be tightened upon each other, to compress the packing when required to prevent leakage. A packing, H, is interposed between the collar B and the sleeve G G' for the same purpose.

To prevent injury to the screw-threads by undue force in driving in the shank, I provide a thick elastic annular cushion, K, on the shank between its shoulder and the sleeve G G'. This cushion relieves the parts of the force of the blow.

I claim as my invention—

1. A faucet having a hollow cylindrical stem, a sleeve through which said stem is adapted to slide, said sleeve having a screw-threaded portion for attachment to a threaded collar on the barrel, a flange on said sleeve, and a packing-ring, as H, which surrounds said sleeve, and is adapted to bear against the collar on the barrel, all in combination, substantially as set forth.

2. The combination, with a faucet having a hollow cylindrical shank, of a screw-threaded sleeve adapted to slide on said shank and to engage with a collar on the barrel, a second screw-threaded sleeve adapted to engage a screw on the first-mentioned sleeve, and an interposed washer between the sleeves, all arranged substantially as set forth.

3. A faucet having a hollow cylindrical shank, in combination with a sliding sleeve or stuffing-box threaded for attachment to the barrel, and with an annular elastic cushion mounted on said shank between said sleeve and the shoulder or body of the faucet, for the purpose of preventing injury when the faucet is driven in in tapping the barrel, substantially as set forth.

In testimony whereof I hereto affix my signature in presence of two witnesses.

NEWTON W. PAYNE.

Witnesses:
A. H. SPENCER,
BENJ. J. DOWNS.